(12) United States Patent
Bueno

(10) Patent No.: US 12,534,613 B2
(45) Date of Patent: Jan. 27, 2026

(54) ANTI-ENVIRONMENTAL STRESS CRACKING ADDITIVE, COMPOSITIONS AND METHODS THEREOF

(71) Applicant: Braskem S.A., Camaçari (BR)

(72) Inventor: Marcos Roberto Paulino Bueno, São Paulo (BR)

(73) Assignee: Braskem S.A., Camaçari (BR)

( * ) Notice: Subject to any disclaimer, the term of this patent is extended or adjusted under 35 U.S.C. 154(b) by 894 days.

(21) Appl. No.: 17/565,002

(22) Filed: Dec. 29, 2021

(65) Prior Publication Data

US 2022/0204744 A1 Jun. 30, 2022

Related U.S. Application Data

(60) Provisional application No. 63/131,620, filed on Dec. 29, 2020.

(51) Int. Cl.
| | | |
|---|---|---|
| *C08L 29/04* | (2006.01) | |
| *C08J 3/12* | (2006.01) | |
| *C08K 3/36* | (2006.01) | |
| *C08K 5/09* | (2006.01) | |

(52) U.S. Cl.
CPC .............. *C08L 29/04* (2013.01); *C08J 3/122* (2013.01); *C08K 3/36* (2013.01); *C08K 5/09* (2013.01); *C08J 2329/04* (2013.01); *C08L 2205/08* (2013.01); *C08L 2205/22* (2013.01); *C08L 2312/00* (2013.01)

(58) Field of Classification Search
CPC ...... C08L 23/06; C08L 2312/00; C08L 29/04; C08L 2205/22; C08L 2205/08; C08K 9/12; C08K 9/04; C08K 5/09
See application file for complete search history.

(56) References Cited

U.S. PATENT DOCUMENTS

| | | | |
|---|---|---|---|
| 4,278,576 A | 7/1981 | Goldman | |
| 2016/0237146 A1* | 8/2016 | Connor | A61K 9/0048 |
| 2017/0096552 A1* | 4/2017 | Habert | C08J 3/005 |
| 2019/0330428 A1 | 10/2019 | Camilo et al. | |

(Continued)

FOREIGN PATENT DOCUMENTS

WO 2019233702 A1 12/2019

OTHER PUBLICATIONS

International Search Report issued in International Application No. PCT/IB2021/022246 dated Mar. 18, 2022 (5 pages).

(Continued)

Primary Examiner — Mark S Kaucher
(74) Attorney, Agent, or Firm — Osha Bergman Watanabe & Burton LLP

(57) ABSTRACT

An anti-environmental stress cracking additive particle, wherein the particle may include an anti-environmental stress cracking active phase, a support phase, and a compatibilizing phase, and wherein the particles have an average size of up to 200 μm. Processes for preparing the anti-environmental stress cracking additive may include a solvent/non-solvent process, a free non-solvent process, and solid state methods. A polymer composition may include a matrix polymer and the anti-environmental stress cracking additive. An article may comprise the polymer composition comprising the anti-environmental stress cracking additive particle.

20 Claims, 4 Drawing Sheets

(56) References Cited

U.S. PATENT DOCUMENTS

2020/0131350 A1   4/2020   Mano et al.

OTHER PUBLICATIONS

Written Opinion issued in International Application No. PCT/IB2021/022246 dated Mar. 18, 2022 (7 pages).
Bubeck, R. A. "Kinetics of environmental stress cracking in high density polyethylene" Polymer, May 1981, vol. 22, pp. 682-686 (5 pages).
Brown, H. R. "A theory of the environmental stress cracking of polyethylene" Polymer, Oct. 1978, vol. 19, pp. 1186-1188 (3 pages).
Lustiger, A. et al. "Importance of tie molecules in preventing polyethylene fracture under long-term loading conditions" Polymer, Dec. 1983, vol. 24, pp. 1647-1654 (8 pages).
Hosoda, S. et al. "Degree of branch inclusion into the lamellar crystal for various ethylene/?olefin copolymers" Polymer, Oct. 1990, vol. 31, pp. 1999-2005 (7 pages).
Lu, C. et al. "Energy efficient ethylene purification in a commercially viable ethane-selective MOF" Separation and Purification Technology 282 (2022) 120126 (8 pages).

\* cited by examiner

ANTI-ENVIRONMENTAL STRESS CRACKING ADDITIVE, COMPOSITIONS AND METHODS THEREOF

BACKGROUND

Polyolefins such as polyethylene (PE) and polypropylene (PP) may be used to manufacture a varied range of articles, including films, molded products, foams, and the like. Polyolefins may have characteristics such as high processability, low production cost, flexibility, low density and recycling possibility. However, physical and chemical properties of polyolefin compositions may exhibit varied responses depending on a number of factors such as molecular weight, distribution of molecular weights, content and distribution of comonomer (or comonomers), method of processing, and the like.

Methods of manufacturing may utilize polyolefin's limited inter- and intra-molecular interactions, capitalizing on the high degree of freedom in the polymer to form different microstructures, and to modify the polymer to provide varied uses in a number of technical markets. However, polyolefin materials may have a number of limitations, which can restrict application such as susceptibility to deformation and degradation in the presence of some chemical agents, and low barrier properties to various gases and a number of volatile organic compounds (VOC). Property limitations may hinder the use of polyolefin materials in the production of articles requiring low permeability to gases and solvents, such as packaging for food products, chemicals, agrochemicals, fuel tanks, water and gas pipes, and geomembranes, for example.

While polyolefins are utilized in industrial applications because of favorable characteristics such as high processability, low production cost, flexibility, low density, and ease of recycling, polyolefin compositions may have physical limitations, such as susceptibility to environmental stress cracking (ESC) and accelerated slow crack growth (SCG), which may occur below the yield strength limit of the material when subjected to long-term mechanical stress. The modern definition of ESC is given by the Standard Terminology Relating to Plastics—D883 as "an external or internal crack in a plastic caused by tensile stresses less than its short-term mechanical strength". Polyolefin materials may also exhibit sensitivity to certain groups of chemical substances, which can lead to deformation and degradation. As a result, chemical sensitivities and physical limitations may limit the success in the replacement of other industry standard materials, such as steel and glass, with polyolefin materials because the material durability is insufficient to prevent chemical damage and spillage.

There are several approaches in the art directed toward increasing material resistance to ESC. Conventionally, methods of altering the chemical nature of the polymer composition may include modifying the polymer synthesis technique or the inclusion of one or more comonomers. However, modifying the polyolefin may also result in undesirable side effects. By way of illustration, increasing the molecular weight of a polyolefin may produce changes in the SCG and ESC, but can also increase viscosity, which may limit the processability and moldability of the polymer composition.

Other strategies may include inclusion of a comonomer and/or blending polyolefins with other polymer classes and additives to confer various physical and chemical attributes. For example, polyolefins may be copolymerized with alpha-olefins having a lower elastic modulus, which results in a considerable increase in environmental stress cracking resistance (ESCR) and resistance to impact but adversely affects the stiffness of the polymer. However, the use of alpha-olefins may have limited effectiveness because, while the incorporation of alpha-olefin comonomers must occur in the high molecular weight fraction in order to affect ESC and impact resistance, many popular catalyst systems have a low probability of inserting alpha-olefins in the high molecular weight fraction, an important factor in forming "tie molecules" between the chains of the surrounding polyolefin that are responsible for transferring stress between the crystalline regions and, consequently, responsible for important mechanical properties. The end result is the production of a polymer composition having reduced structural stiffness. It is also noted that, while advances have developed catalysts that increase the likelihood of displacing the incorporation of a comonomer to the highest molecular weight range, and that multiple reactors may be used to address these limitations, such modifications are expensive alternatives and not wholly effective in balancing resistance to impact and ESC without negatively affecting stiffness.

Polymer modification by blending may vary the chemical nature of the composition, resulting in changes to the overall physical properties of the material. Material changes introduced by polymer blending may be unpredictable, however, and, depending on the nature of the polymers and additives incorporated, the resulting changes may be uneven and some material attributes may be enhanced while others exhibit notable deficits. The incorporation of a second phase into the matrix polymer, which generally has a different chemical nature, may increase the resistance to impact and ESC resistance in some cases. However, like the copolymerization strategy, polymer blends are often accompanied by a marked loss in stiffness, because the blended materials may have lower elastic modulus than the matrix polyolefin.

In blends with rubbery particles, the presence of particles changes the local stress state through a microstructural process that consumes the needed energy to crack propagation. In polystyrene, this toughness mechanism is well known and dependent on some specific conditions to work, such as particle size and particle amount. In the case of semi-crystalline polymers such as polyethylene, the improvement in SCG and ESC resistance by the use of soft particles is still an issue.

In addition, test methods such as the Bell Test, a constant strain method, used for the evaluation of ESC resistance can give ambiguous results. When comparing a polymer resin to the same resin with soft particles added, the material with the additive particles will exhibit a drop in stiffness. In a constant strain test, such as the Bell Test, the results may be affected by both the expected increase in ESC resistance, as well as the lower level of stress experienced by the sample, relative to the polymer resin alone.

An alternative method for increasing material ESC resistance involves using polar blends. For example, polyethylene and ethylene-vinyl acetate (EVA) have been mixed to form polymer blends to improve ESC resistance. However, the mechanism resulting in the ESC resistance gain is not clear, and in addition, the low modulus of EVA results in a loss of stiffness of the blended material.

Accordingly, there exists a continuing need for developments in polyolefin compositions to have increases in environmental stress cracking resistance while balancing the mechanical properties of the polymer.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure are directed to an anti-environmental stress cracking additive particle, wherein the particle may comprise an anti-environmental stress cracking active phase, and optionally a support phase and a compatibilizing phase. The particles have an average size of up to 200 µm. The anti-environmental stress cracking active phase may optionally be crosslinked with a crosslinking agent.

In another aspect, embodiments of the present disclosure are directed to processes for producing anti-environmental stress cracking additive particles, the processes including the preparation of a precursor solution, the production of a plurality of particles, optionally crosslinking or otherwise modifying the particles, the drying of the particles, and optionally the modifying of the particles after drying via solid state methods.

In another aspect, embodiments of the present disclosure are directed to a composition which may include a matrix polymer and the anti-environmental stress cracking additive particle.

In another aspect, embodiments of the present disclosure are directed to an article comprising the polymer composition comprising the anti-environmental stress cracking additive particle.

Other aspects and advantages of the claimed subject matter will be apparent from the following description and the appended claims. Other aspects and advantages of the claimed subject matter will be apparent from the following description and the appended claims.

DETAILED DESCRIPTION

Figure 1:
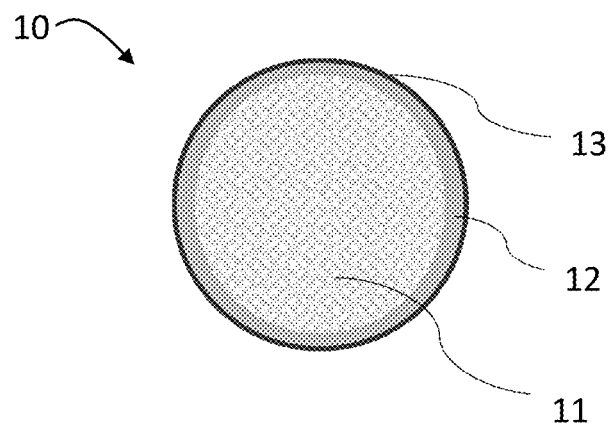
FIG. 1 is a schematic of an anti-ESC additive particle.

Embodiments of the present disclosure are directed to a polymeric additive that may be used to improve environmental stress cracking resistance of a matrix polymer, such as a polyolefin. That is, one or more embodiments are directed to an anti-ESC additive that may take the form of a particle that may be used to improve the ESCR of a polymer composition to which it is added.

As mentioned above, ESC has conventionally been a difficult property to improve, particularly without negative impacting other mechanical properties such as stiffness. The cause of complexity of the ESC phenomenon lies in the fact that ESC has, as a root cause, a combination of two parallel phenomena. The first being the involved failure mechanism. Under long-term loading, a polymer material might fail by a crazing mechanism. Failure due to crazing may happen at stress levels well below the material yielding stress, presenting a macroscopic brittle failure. Understanding the role of craze morphology is essential to clarifying the ESC phenomenon. In the craze formation and propagation, when a part of the polymeric material is under plane strain state conditions, pre-existing microstructural defects cavitate forming voids. The void growth and propagation are affected by the molecular orientation of polymeric regions at or near the voids. Highly oriented polymeric regions are named microfibrils, which are responsible for crack stabilization. Microfibrils are responsible for bearing load locally. Over time, microfibrils elongate and break giving rise to the cracks. Cracks will propagate until the total failure of a part of a material. This failure mode is well known by the process named slow crack growth (SCG).

The second phenomenon involved in ESC is the local diffusion of a particular class of molecules, known as environmental stress active molecules, or simply stress active molecules (SAMs). Detergents, alcohols and silicone oils are the main chemical classes of SAMs for polyethylene. Three molecular parameters are considered to correlate well with the stress active molecules efficiency in promoting ESC. The first is the Hansen Solubility Parameter. The lower the difference between polymer-molecule solubility parameter, the greater the SAM efficiency. The second parameter is the molar volume. SAM molecules having a small molar volume and also a small polymer-molecule solubility difference (Hansen solubility parameter) will dissolve or swell the bulk material. In this case, the material will fail in ductile manner, and the ESC phenomenon won't be observed. The third parameter is the SAM shape. Laminar molecules exhibit a greater SAM efficiency.

In a general context, when the molecular parameters meet the above conditions, and the material is also under slow crack growth conditions, the ESC will happen. ESC is in fact an acceleration of SCG phenomenon. In the ESC phenomenon, the diffusion of SAMs is intensified in the local region named the damaged zone by a mechanism known as stress-induced swelling. The damaged zone comprises the craze and the disrupted zone. A disrupted zone is the polymeric region located in the craze microfibrils ends or shoulders. The deformation process causes local molecular disorder in the disrupted zone, increasing the free volume, which increases diffusion propensity. Due to the craze presence, the damaged zone is highly porous, which increases the local molecular absorption. Therefore, parallel to the slow crack growth, SAMs accumulate in the disrupted zone in the microfibrils shoulders of the craze. The plasticizing action of SAMs will speed up the creep rate of microfibrils, increasing the SCG rate. Then, the process is to be considered ESC.

Thus, the ESC phenomenon runs through two concomitant microstructural mechanisms. The first mechanism of the ESC phenomenon related to the intrinsic failure due to SCG is referred to as "Process I". The second and parallel mechanism, related to the diffusion process of SAMs into the damage zone wherein the process is enhanced by a mechanism known as stress-induced swelling, is hereinafter called "Process II". Further complicating the ESC phenomenon is that SCG under Process I may be accelerated by the ESC phenomenon of Process II such that without the Process II, failures under Process I would be rare. Thus, the present inventors seek to interfere in this Process II without denigrating the stiffness of the composition, and by interfering with Process II, failures by Process I may be likewise reduced.

In order to interfere with Process II, the anti-ESC additive may contain a polymeric phase, also referred to as an ESC-active phase, configured to interfere in the ESC failure mechanism, such as by absorbing stress active molecules in particular. Such polymeric phase may include one or more non-polar or polar polymers selected to absorb SAMs. While detergents, alcohols and silicone oils are the primary classes of SAMs for polyethylene, it is understood that depending on the type of polymer composition to which the presently described additives are added, the SAMs corresponding to such polymer composition, and thus the active phase selected to absorb such SAMs, may vary. For example, fat present in food causes ESC in polystyrene, and thus the ESC-active may be selected based a chemical affinity possessed for fat, which may be a non-polar polymer.

In one or more embodiments, the ESC-active phase may include one or more polar polymers. Such polar polymers may include, but are not limited to, any polymer containing hydroxyl, carboxylic acid, carboxylate, ester, ether, acetate, amide, amine, epoxy, imide, imine, sulfone, phosphone, functional groups, as well as derivatives thereof.

In one or more embodiments, the ESC-active phase may contain a water insoluble polar polymer. The water insoluble polar polymer may optionally be crosslinked, and may include but is not limited to crosslinked polar polymers containing carboxylic acid, carboxylate, ester, ether, acetate, amide, amine, epoxy, imide, imine, sulfone, phosphone, and any derivatives of the aforementioned groups, as functional groups, among others.

In one or more embodiments, the ESC-active phase may contain a water soluble polar polymer. The water soluble polar polymer may optionally be crosslinked and may, include but is not limited to crosslinked water soluble polar polymers containing poly(vinyl alcohol) (PVA), chitosan, gelatin, dextran, poly(lactic acid), poly(ethylene glycol), cellulose microfibrils, cyclodextrin, poly(ε-caprolactone), carboxymethyl cellulose, n-vinylcaprolactam, poly(ethylene glycol)methyl ether, cellulose nanofiber, poly(ethylene glycol) methacrylate, poly((propylene glycol) methacrylate), and poly(vinyl methyl ether).

In one or more embodiments, the ESC-active phase may include polymer hydrogels. Polymer hydrogels (PHG) may be obtained from monomers or polymers which can be synthesized or may be natural polymers, and may include but are not limited to polymers formed from hydroxyethyl methacrylate (HEMA), hydroxyethoxyethyl methacrylate (HEEMA), ethylene glycol dimethacrylate (EGDMA), N-vinyl-2-pyrrolidone (NVP), hydroxydiethoxyethylmethacrylate (HDEEMA), methoxyethyl methacrylate (MEMA), methoxyethoxyethyl methacrylate (MEEMA), methoxy-diethoxyethyl methacrylate (MDEEMA), vinyl acetate (VAc), acrylic acid (AA), N-(2-hydroxypropyl) methacrylamide (HPMA), ethylene glycol (EG), PEG acrylate (PEGA), PEG methacrylate (PEGMA), PEG diacrylate (PEGDA), and PEG dimethacrylate (PEGDMA). Polymerization of PHG may be initiated by an initiator, such as, but not limited to, 2,20-azobis (isobutyronitrile), ammonium persulfate (APS), and potassium peroxidisulfate. Further, in one or more embodiments, the PHG may be crosslinked by a crosslinking agent such as, but not limited to, epichlorohydrin (ECH), N,N0-Methylene-bis-acrylamide (N,N0-MBAAm)(BIS) and divinyl sulfone (DVS), to form a polymer hydrogel.

In one or more embodiments, the anti-ESC additive may take the form of rigid particle including the ESC-active phase which is configured to interfere in the polymer environmental stress cracking through absorption of SAMs, thereby interfering with the aforementioned Process II. Further, the anti-ESC additive may be a rigid particle able to interfere in the polymeric environmental stress cracking failure mechanism without substantially degrading the stiffness of the matrix polymer to which the anti-ESC additive is added.

In one or more embodiments, the anti-ESC additive may be a particle having one or more phases, including at least the ESC-active phase material described above. FIG. 1 depicts an embodiment of a particle 10 comprising three phases; however, it is also within the scope of the present disclosure that a particle may include one, two, or all three phases, so long as the ESC-active phase is present. As shown, the core of said particle 10 is a support phase 11. An ESC-active phase 12 is shown applied to the surface of support phase 11. A compatibilizing phase 13 is applied to an external surface of ESC-active phase 12. While the details of the ESC-active phase 12 are described above, details for the optional support phase 11 and/or compatibilizing phase 13 are below.

Support phase 11 may include any organic or inorganic particle, which has a function of supporting the ESC-active phase 12. The use of the support phase 11 may be desirable to allow for a reduced quantity of ESC-active phase and/or to provide rigidity to the particles.

In one or more embodiments, an inorganic material forms the support phase 11. For example, support phase 11 may include additive materials commonly used as fillers and reinforcement particles in plastics, such as, but not limited to fillers and reinforcement particles having a nanoparticle size. Examples include, but are not limited to calcium carbonate, kaolin, feldspar and nepheline fillers, silica, talc, miscellaneous mineral fillers, metal filers, magnetic fillers, antimony oxide, alumina trihydrate, miscellaneous flame retardants, carbon black, solid spherical fillers, hollow spherical fillers, mica, high aspect ratio mica, other flake reinforcements, wollastonite, asbestos, micro and short fibers, whiskers, fiber glass, basalt fibers, boron filaments, carbon-graphite filaments, alumina oxide and other ceramic filaments, and metal filaments. One or more embodiments utilize high performance particles, such as nanoparticles and highly porous particles obtained by a sol-gel synthesis method including, but not limited to nanoclays, zeolites, dendrimers, and hybrid particles.

In one or more embodiments, the support phase that may be formed from a precursor during synthesis of the additive. For example, the precursor may be produced through an inorganic synthesis method, or the precursor might be added as raw material. It is also envisioned that the precursor surface may be modified to improve the compatibility with the ESC-active phase applied thereon.

In one or more embodiments, the support phase 11 may have a regular shape, an irregular shape, or clusters thereof. Regular shapes may include, but are not limited to sphere, cube, block, flake, fiber and their clusters. In one or more embodiments, a spherical or spheroidal shape may be used for the support phase 11, which may result in minimizing losses in impact resistance of the final polymeric material to which the additive is added.

Referring back to FIG. 1, as described above, the ESC-active phase 12 may optionally have a compatibilizing phase 13 applied to an external surface thereof. The compatibilizing phase may be formed from any material able to act as a compatibilizing agent or even as coupling agent having the function of improving the dispersion of the additives in a polymeric matrix during blending. Thus, the compatibilizing phase 13 may be desirable when there is chemical incompatibility between the matrix polymer into which the additive is added and the ESC-active phase. Further, while FIG. 1 shows a compatibilizing phase 13 present as the outermost layer of the particles 10 (internal compatibilizing agent), it is also envisioned that a compatibilizing agent may be added as an external additive (external compatibilizing agent) component separate from the particles 10. Although the presence of the compatibilizing phase is envisioned to be present as the outermost layer of the particles, a person skilled in the art may recognize that compatibilizing agents could migrate within the particle, therefore particles may also comprise compatibilizing agents within the inner ESC-active phase and/or the support.

In embodiments utilizing a compatibilizing phase as a layer of the anti-ESC additive (internal compatibilizing agent), the compatibilizing phase may, in addition to improving additive dispersion into the polymer matrix, also advantageously improve the anti-ESC additive barrier to moisture. Specifically, inclusion of a compatibilizing phase may prevent dampening of the additive (particularly the hydrophilic ESC-active phase) such as by even water present in the air humidity. Excessive moisture may cause bubbles or other defects during final piece production.

In one or more embodiments, the compatibilizing phase may be selected from chemical agents that can act as an internal compatibilizing agent added in the particle, being capable of increasing the dispersion of the anti-ESC additive particles into the polymeric matrix. Compatibilizing agents may be selected from organic acids, anhydrides of organic acids, amides of organic acids, salts of organic acids, epoxies, silanes, ionomers, and combinations thereof. In one or more embodiments, compatibilizing agents may be selected from carboxylic acids and their derivatives such as esters, amides or salts thereof.

In particular embodiments, the compatibilizing phase may be selected from fatty acids with saturated or unsaturated aliphatic chains comprising 4 to 28 carbon atoms and/or esters, amides, and salts thereof. In particular embodiments, the compatibilizing phase may be selected from the group consisting of stearic acid, oleic acid, caprylic acid, capric acid, lauric acid, myristic acid, palmitic acid, arachidic acid, behenic acid, lignoceric acid, cerotic acid, myristoleic acid, palmitoleic acid, sapienic acid, elaidic acid, vaccenic acid, linoleic acid, linolelaidic acid, arachidonic acid, eicosapentaenoic acid, erucic acid, docosahexaenoic acid, their esters, salts, amides, and combinations thereof.

It is also envisioned that compatibilizing agents may be added as an external compatibilizing agent (i.e., not included in the particle as a compatibilizing phase), acting as a separated additive to the polymer composition, which may compatibilize the anti-ESC additive particles with a polymeric matrix. In particular embodiments, external compatibilizing agents may be any polyolefin which had its chemical composition altered by grafting or copolymerization, or other chemical process, using polar functionalizing reagents. Functionalized polyolefins in accordance with the present disclosure include, for example, polyolefins functionalized with maleic anhydride, maleic acid, acrylic acid, methacrylic acid, itaconic acid, itaconic anhydride, methacrylate, acrylate, epoxy, silane, succinic acid, succinic anhydride, ionomers, and their derivatives, or any other polar comonomer, and mixtures thereof, produced in a reactor or by grafting.

In one or more embodiments, the additive particle has a support phase present in an amount, with respect to the total mass of the additive particle, ranging from a lower limit of any of 0 wt %, 0.1 wt %, 0.5 wt %, 1 wt %, 2 wt %, 10 wt %, 20 wt %, 30 wt %, 50 wt %, 60 wt %, 70 wt %, 80 wt % or 90 wt % to an upper limit of any of 20 wt %, 30 wt %, 40 wt %, 50 wt %, 60 wt %, 70 wt %, 75 wt %, 85 wt %, 90 wt %, 95 wt %, 99 wt %, or 99.9 wt %, where any lower limit can be used in combination with any upper limit.

In one or more embodiments, the additive particle has an ESC-active phase present in an amount, with respect to the total mass of the additive particle, ranging from a lower limit of any of 0.1 wt %, 0.5 wt %, 1 wt %, 2 wt %, 3 wt %, 4 wt %, 5 wt %, 6 wt %, 7 wt %, 8 wt %, 9 wt %, 10 wt %, 20 wt %, 30 wt %, 40 wt %, or 50 wt % to an upper limit of any of 5 wt %, 10 wt %, 15 wt %, 20 wt %, 25 wt %, 30 wt %, 35 wt %, 40 wt %, 45 wt %, 50 wt %, 75%, 85%, 90%, 95%, 99%, 99.9%, or 100%, where any lower limit can be used in combination with any upper limit.

In one or more embodiments, the additive particle has a compatibilizing phase present in an amount, with respect to total mass of additive particle, ranging from a lower limit of any of 0 wt %, 0.1 wt %, 0.5 wt %, 1 wt %, 2 wt %, 3 wt %, 4 wt %, 5 wt %, 6 wt %, 7 wt %, 8 wt %, 9 wt %, 10 wt %, 20 wt %, or 50 wt % to an upper limit of any of 5 wt %, 6 wt %, 7 wt %, 8 wt %, 9 wt %, 10 wt %, 15 wt %, 20 wt %, 30 wt %, 40 wt %, 50 wt %, 75 wt %, 85 wt %, 90 wt %, 95 wt %, 99 wt %, or 99.9 wt %, where any lower limit can be used in combination with any upper limit.

In one or more embodiments, the anti-ESC additive particle, including at least one of the above described phases, has a regular or irregular shape, or clusters thereof. Regular shapes include, for example, a sphere, cube, block, flake, fiber and their clusters.

In a particular embodiment, the anti-ESC additive particle may be spherical or spheroidal, which may allow for the additive to minimize or at least reduces losses in impact resistance of the final polymeric material to which the anti-ESC additive particle is added.

In one or more embodiments, the anti-ESC additive particle has an average particle size of less than 200 μm, such as less than 150 μm, 100 μm, 75 μm, 50 μm, 25 μm, 10 μm or 5 μm.

The size analysis is performed by a Malvern method, using isopropanol, or other suitable medium, as the dispersion medium to minimize particle swelling or decomposition during measurement. For a given anti-ESC additive particle amount, smaller particles impart greater anti-ESC efficiency, due to the increased available surface area, relative to larger particles.

Alternatively, average particle size may also be determined with the particles dispersed in a polymer composition, by calculating relevant statistical data regarding particle size. In some embodiments, SEM imaging may be used to calculate particle size and develop size ranges using statistical analysis known for polymers and blends. Samples may be examined using SEM after hot pressing the polymeric samples (with the particles dispersed therein) in accordance with ASTM D-4703 and polishing by cryo-ultramicrotomy the internal part of the plate. Samples may be dried and submitted to metallization with gold. The images may be obtained by FESEM (Field Emission Scanning Electron Microscopy, Model Inspect F50, from FEI), or by Tabletop SEM (Model TM-1000, from Hitachi). The size of each crosslinked polar polymer particle may be measured from these images using the software LAS (version 43, from Leica). Calibration may be performed using the scale bar of each image and the measured values can be statistically analyzed by the software. The average value and standard deviation are given by the measurement of, at least, 300 particles.

Matrix polymers to which the presently described additive (and optionally an external compatibilizing agent) may be added include polyolefins, but it is also envisioned that the additives may be added to any type of polymer susceptible to ESC. In one or more embodiments, polyolefins include polymers produced from unsaturated monomers (olefins or "alkenes") with the general chemical formula of $C_nH_{2n}$, and optionally copolymers thereof. In some embodiments, polyolefins may include ethylene homopolymers, copolymers of ethylene and one or more C3-C20 alpha-olefins, propylene homopolymers, heterophasic propylene polymers, copolymers of propylene and one or more comonomers selected from ethylene and C4-C20 alpha-olefins, olefin terpolymers and higher order polymers, and blends obtained from the mixture of one or more of these polymers and/or copolymers.

The anti-ESC additive may be added to the matrix polymer in an amount ranging from 0.001 to 50 wt % of the polymer composition, including from a lower limit of any of 0.001 wt %, 0.1 wt %, 0.5 wt %, 1 wt %, 3 wt %, 5 wt %, 10 wt %, 20 wt % or 25 wt % to an upper limit of any of 5 wt %, 6 wt %, 7 wt %, 8 wt %, 9 wt %, 10 wt %, 15 wt %, 20 wt %, 30 wt %, 40 wt % or 50 wt % where any lower limit can be used in combination with any upper limit.

In one or more embodiments, polymer compositions of the present disclosure may also contain a number of other functional additives that modify various properties of the composition such as antioxidants, pigments, fillers, reinforcements, adhesion-promoting agents, biocides, whitening agents, nucleating agents, anti-statics, anti-blocking agents, processing aids, flame-retardants, plasticizers, light stabilizers, and the like.

As mentioned above, the anti-ESC additive may be a rigid particle able to interfere in the polymeric environmental stress cracking mechanism without degrading the material stiffness of the matrix polymer to a significant extent. In one or more embodiments, the anti-ESC additives may have a minimum relevant efficiency of at least 0.01 or 10%, depending on the test, and a maximum acceptable stiffness loss rate of 100 MPa/(% w/w).

ESC interference may be measured using a number of standardized methods that are widely used to measure ESC resistance for a polymer matrix. In some instances, the method used to measure ESC resistance may be dependent on the stiffness of the material being measured, whereas in other instances the ESC resistance measurement is not dependent upon the material stiffness.

The present disclosure discusses three methods by which ESC interference and influence of possible stiffness loss can be measured.

Figure 2:
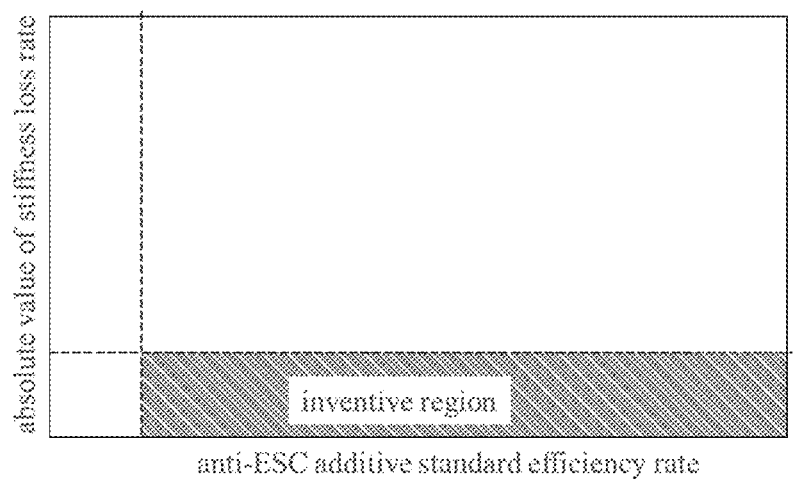
FIG. 2 illustrates a property region defined by the balance of ESC additive efficiency and stiffness.

In a first embodiment, the measurement of ESC interference may be obtained by a Bell test, performed according to ASTM D1693-15. Using this method, the ESC interference may be measured by the slope of the curve of ln ESC resistance vs the anti-ESC additive amount (% w/w). The slope is obtainable by the linear fitting using a least squares regression analysis. In the cases using the Bell test, where the standard method is stiffness dependent, the efficiency of the ESC resistance will herein be called an "anti-ESC additive standard efficiency rate." FIG. 2 shows the balance of properties possessed by the present anti-ESC additives, which is a property region defined by the balance of anti-ESC additive efficiency to stiffness. When the Bell test is used, anti-ESC additive may have an anti-ESC additive standard efficiency rate of at least 0.01. When a constant strain test, such as the Bell test, is used, the final result may be influenced by the stiffness. A material undergoing a constant strain test, which has a lower stiffness, will experience a lower stress than a material with higher stiffness. Therefore, when a constant strain test is used, any material stiffness loss may also be measured.

The stiffness loss is measured by absolute value, or modulus, of the slope of the linear fitting curve of the flexural modulus resistance against anti-ESC additive amount (% w/w) using a concentration range from 0 to 10 (% w/w) or, alternatively, by the absolute value of the slope of the linear fitting curve of the stiffness against anti-ESC additive amount (% w/w) using a concentration range from 0 to 10 (% w/w). The curve will be determined by the best linear fitting, using the method of least squares in the regression analysis.

To assess the stiffness loss, flexural modulus may be measured according to ASTM D790, procedure B, at room temperature, using the secant modulus at 1% strain calculus or, alternatively, stiffness may be measured by Dynamic Mechanical Analysis, Storage Modulus (E'; MPa) at T=40° C., extracted form E' against T curve, in the temperature range from −20° C. to 100° C. under constant strain at frequency of 1 Hz.

ESC interference may be measured by a second method in which the ESC resistance measurement is not influenced by material stiffness, referred to in the art as the Ohde-Okamoto test. In the Ohde-Okamoto test, when materials having different stiffness are compared, the strain is adjusted in such a way that the stress is the same over all specimens, and it remains constant until total failure is achieved. By using Ohde-Okamoto test, the ESC interference, and thus anti-ESC additive efficiency, may be measured by the slope of curve log ESC resistance against anti-ESC additive amount (% w/w) in the concentration range from 0 to 10 (% w/w) in the polymer matrix. The curve will be determined by the best linear fitting, using the method of least squares in the regression analysis. In the case where the Ohde-Okamoto method is applied, the additive efficiency is referred to as the "anti-ESC additive pure efficiency rate". When the Ohde-Okamoto test is used, the anti-ESC additive may have an anti-ESC additive pure efficiency rate of greater than 0.01.

A third method of measuring the ESC resistance that is also not influenced by the material stiffness may be used. The third anti-ESC additive efficiency method is performed on a notched specimen in a creep test configuration, a temperature of 50° C., and using two different media, a neutral medium and an active medium. The neutral medium may be water or another suitable medium. The active medium may be an aqueous solution of standardized surface active molecules commonly used for the material being measured, or another suitable medium. The third anti-ESC additive efficiency method may be applied to both a reference polymer and polymer containing 10% (w/w) of the anti-ESC additive.

The efficiency may be measured by the difference of transition time from SCG to ESC in the curve log failure time against log stress, in reference to the same polymer with and without 10% (w/w) of the anti-ESC additive. In the case where this third test is used, considering the log failure time against log stress, the additive efficiency is referred to as "anti-ESC additive intrinsic efficiency rate". When this third test is used, the anti-ESC additive may have an anti-ESC additive intrinsic efficiency, defined by the improvement in the SCG to ESC transition time between a polymer reference and a polymer containing 10% (w/w) of the inventive anti-ESC additive, of greater than 10%.

Additive Synthesis

Embodiments of the present disclosure are also directed to methods of forming the anti-ESC additives. The synthesis may include various solvent-based processes, which may generally include (a) producing a precursor solution, (b) producing particles, (c) drying the particles, and (d) recovering solvents. Optionally, the process may also include a particle modification, which may occur after the particles are produced, and depending on the modification being performed, may be performed prior to or after drying the particles.

In one or more embodiments, the anti-ESC additives may be formed by a process using two main liquid media, specifically a solvent used to produce the particles and a non-solvent medium to modify the particles, which may occur before the drying, such that the process may include: (a) producing a precursor solution; (b) producing particles; (e) modifying the particles in a non-solvent medium; (c) drying the particles; and (d) recovering solvents.

During the precursor solution production step (a), the chosen polymer (to form the ESC-active phase) is dissolved in a first solvent liquid medium to produce a homogeneous phase. It is envisioned that a particle forming the support phase may optionally be added to the solution or may alternatively be synthetized in the precursor solution. In embodiments utilizing a support phase, in which particles are added or synthetized in the precursor solution, the "precursor solution" may in fact be a "precursor suspension" or "slurry".

The particle production under step (b) may generally include any method able to produce a particle arising from a polymeric solution. Production processes suitable for producing anti-ESC additive particles may use, for example, emulsions, phase separation (coacervation), spray drying, ion gelation, polyelectrolyte complexation, supercritical fluids precipitation, microfluidic devices, and superhydrophobic surfaces. Further, in one or more embodiments, an in situ polymerization process may also be used, which may include, but are not limited to, oil-in-water suspension polymerization, precipitation and suspension polymerization, oil-in-water emulsion polymerization, and oil-in-water mini- or microemulsion polymerization.

Optionally, a crosslinking agent may be added to the precursor solution in step (a). When a crosslinking agent is added in the production of precursor solution step, the crosslinking agent must remain in inert form, or the medium should be adjusted in order that the crosslinking reaction kinetics are kept slow during step (a). Optionally, crosslinking may be triggered during step (b).

After particle production step (b), a particle modification in non-solvent medium step (e) may be performed. The use of a non-solvent may allow for particle modification without significant morphological changes. Optionally, a crosslinking agent may be added in this step. Additionally, a compatibilizing agent may also optionally be added in this step to result in a chemical or physical deposition on the particle surface before or during subsequent non-solvent removal. Following the particle modification step (e), any method suitable to dry a particle may be used in step (c). Finally, step (d) may include any method suitable to recover solvents.

In one or more embodiments, the anti-ESC additives may be formed by a process using only one solvent, referred to as free non-solvent process, which may include (a) producing a precursor solution; (b) producing particles; (c) drying the particles; and (d) recovering solvents. In such embodiment, it is envisioned that the components present in the precursor solution may include a solvent, polymer, crosslinking agent, compatibilizing agent, and support. Further, a non-solvent process refers to use of post chemical modification (crosslinking and compatibilizing deposition in the non-solvent environment) is not needed.

In one or more embodiments, the anti-ESC additives may be formed by a process using only one solvent, but which includes a solid state particle modification process, and which may include: (a) producing a precursor solution; (b) producing particles; (c) drying the particles; (f) modifying the particles using a solid state method; and (d) recovering solvents. In such embodiment, it is envisioned that the components present in the precursor solution may include a solvent, polymer, cross-linking agent, compatibilizing agent, and support.

In step (f), any solid state method may be used to modify the particle by techniques, including, but not limited to, ultra-violet light, electron beam, high energy electron beam, x-ray beam, and gamma radiation.

In the preceding processes, the precursor solution is described to contain a support; however, it is envisioned that such support may include an inorganic particle that is added as a raw material in step (a), or it may optionally be synthesized in the same step (a). Such support may be formed by any inorganic synthesis method may. In one or more embodiments, when the support is synthesized in the production of precursor solution step, a sol-gel method may be used.

EXAMPLES

Example 1—Bulk PVA Particles

Sample Preparation
Polymer Precursor Solution 25.0 g of polyvinyl alcohol resin (Poval 28-98 commercialized by Kuraray) ("PVA") was transferred to a 1000 mL three-neck round-bottom flask and then placed on a heating mantle having a support with stirrer, thermometer and glass condenser. After, a volume of 800 mL of distilled water was added to the flask and heated under stirring at a temperature of 80° C. to 90° C. for 1 h. Then, the solution was kept in room temperature for 2 h, followed by filtering in a #200 metallic mesh to eliminate particulates. This precursor solution had a PVA concentration of 2.5 wt %.

Bulk Particle Production Solution 320 mL of the POLYMER PRECURSOR SOLUTION was transferred to a 1000 mL graduated cylinder, then completed to its full volume with distilled water. The BULK PARTICLE PRODUCTION SOLUTION exhibited a PVA concentration of 0.8 wt %.

Bulk Particle Production

The PVA bulk particles were produced by a spray drying method. The following conditions were set up in a Mini Spray Dryer Büchi B-290:
1. Feeding method: continuous production by use of 500 mL batch solution of 0.8 wt % of PVA (BULK PARTICLE PRODUCTION SOLUTION).
2. Inlet temperature=140° C.
3. Outlet temperature=was kept >60° C. during particle production
4. Aspirator=80%
5. Pump=26%

Figure 3:
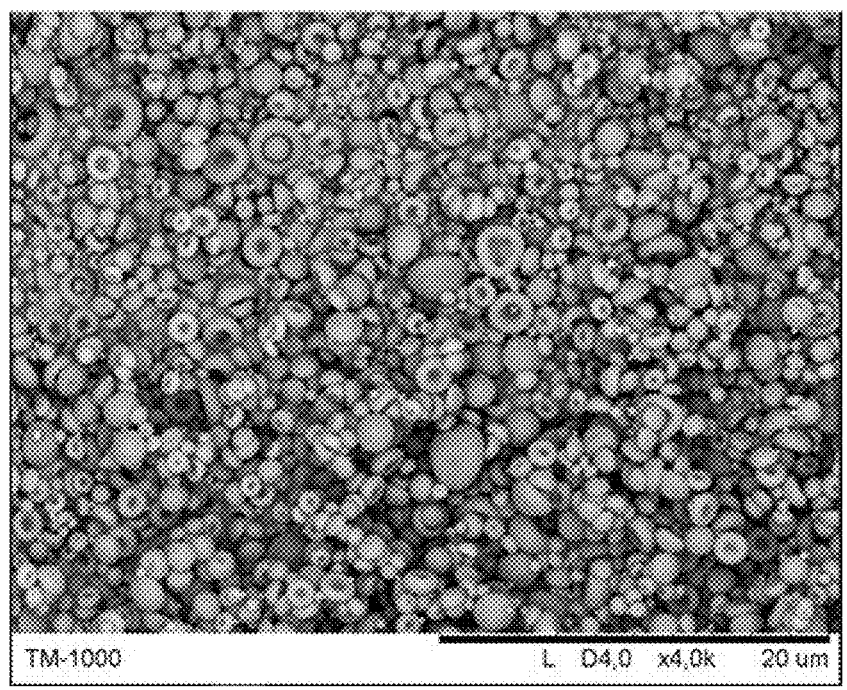
FIG. 3 is a Scanning Electron Microscopy (SEM) of an inventive PVA Bulk particle having a biconcave disc shape.
Figure 4A:
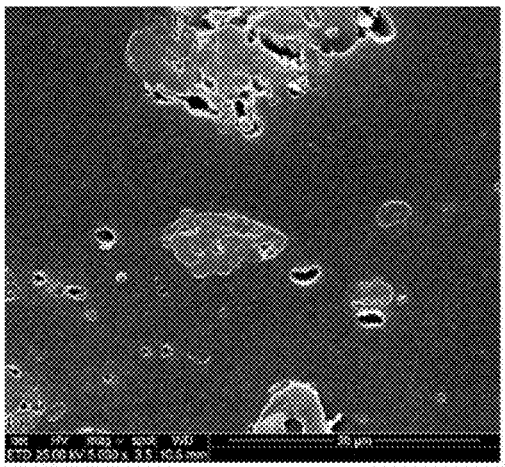
FIG. 4A-4D are SEM images illustrating the dispersion performance of inventive additive particles in polymer compositions.
Figure 4B:
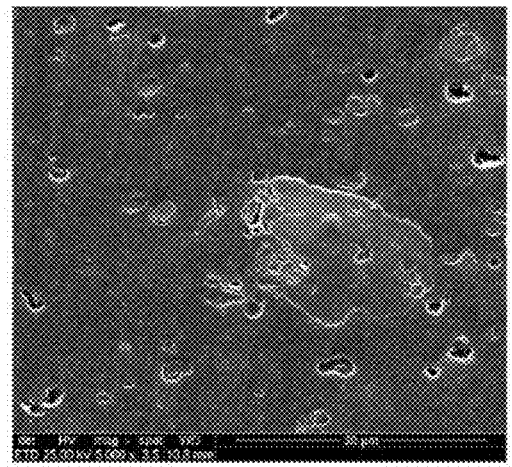
Figure 4C:
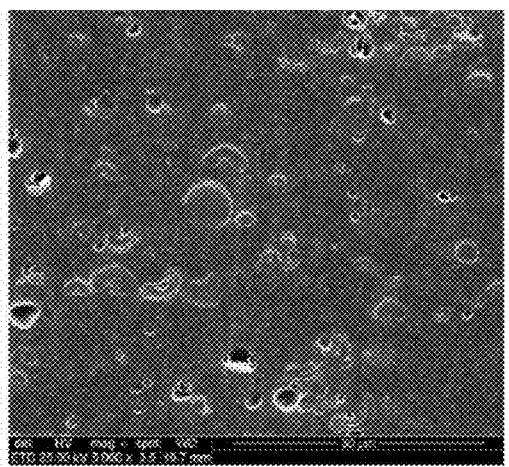
Figure 4D:
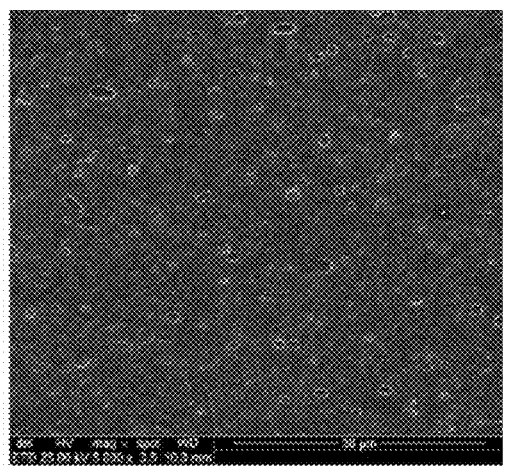

The above method produced bulk PVA particles (100 wt % PVA) with an apparent average particle size around 5 μm with a biconcave shape as can been seen in FIG. 3.

PVA Bulk Particle Crosslinking

Crosslinked bulk PVA particles were prepared through a crosslinking reaction carried out in a semi-swelling medium. For this purpose, a volumetric 1:2 water:acetone solution was used. Acetone is a non-solvent to PVA and the water partially swells PVA particles under such conditions, having the function of allowing crosslinking reactants to reach polymer molecules under solid state reaction (therefore, keeping the particle morphology relatively intact). To reduce reaction time, an acid catalyst was applied. The pH was adjusted in 2.3 with the addition of HCl 1N under stirring. The solution was transferred to an amber flask to be used after.

The crosslinked particle was obtained as follows:
1. 40 g of Glutaraldehyde solution (crosslinking agent) from Sigma-Aldrich (50 wt % in water) was added into a two-neck round-bottom flask.
2. 250 mL of reaction medium (pH=2.3) was added under slow shaking.
3. After homogenization, 7.2 g of PVA particle (PVA Bulk Particle) was added.
4. A stirring bar was added and the flask was closed with a glass condenser.
5. The reaction was conducted under reflux at 60° C. for 2 h.
6. After reacting, the heating was turned off and the system was cooled down to room temperature for 2 h.
7. The Modified Bulk Particle (crosslinked bulk PVA particles) was transferred to a vacuum filtration system. The solid powder was then washed with 300 mL of acetone.
8. The Modified Bulk Particle was then dried in a vacuum oven overnight.
9. The Modified Bulk Particle was then stored inside a desiccator until the compatibilization step.

PVA Bulk Particle Compatibilization

The amount of compatibilizing agent (stearic acid reagent grade, 95%) was calculated based on particle mass. To further understand the influence of compatibilizing agent amount on particles in the polymer dispersion, the following procedure was conducted in a way that final stearic acid concentrations of 0, 0.7 wt %, 6.7 wt % and 13.3 wt % in the particle were obtained.
1. Stearic acid mass quantities, as shown in Table 1, were transferred to a 250 mL Becker Flask containing 100 mL acetone assembled in magnetic stirrer.

TABLE 1

Concentration of Stearic Acid (compatibilizing agent) in the Particle

| Particle Name | Final Concentration in the Particle (wt %) | Previously Modified (crosslinking)? | Mass of stearic acid (g) |
|---|---|---|---|
| Not Comp. Bulk Particle | 0.0 | unmodified | 0 |
| Comp. Bulk Particle 1 | 0.7 | unmodified | 0.0377 |
| Comp. Bulk Particle 2 | 6.7 | unmodified | 0.3766 |
| Comp. Bulk Particle 3 | 13.3 | modified | 0.7533 |

2. The stearic acid was kept under stirring until complete dissolution was achieved.
3. To perform compatibilization, a mass of 5.65 g of Unmodified and Modified Bulk Particle were transferred to four Becker Flasks having corrected stearic acid to obtain the calculated particle mass.
4. The four Becker Flasks containing the particles were placed on a stirrer hot plate, where evaporation was conducted under a temperature of 60° C., under stirring and nitrogen flow.
5. After the particle got a "paste appearance", a complete drying was conducted inside a vacuum oven at 60° C. overnight.
6. Those four particle samples were stored inside a desiccator for further polymer dispersion study.

Results

Particle Dispersion in Polymer Composition and Particle Influence on ESCR Improvement To understand the influence of compatibilization agent amount on particle dispersion and the influence of the additive particles on ESCR assessment, the following polymer composition formulations were prepared.

TABLE 2

Polymer composition samples with inventive anti-ESC additive particles

| | REFERENCE | F1 | F2 | F3 | F4 |
|---|---|---|---|---|---|
| Particle added to the polymer composition | — | Not Comp. Bulk Particle | Comp. Bulk Particle 1 | Comp. Bulk Particle 2 | Comp. Bulk Particle 3 |
| wt % of PVA in the polymer composition | 0 | 15 | 15 | 15 | 15 |
| Mass of Polymer (g) | 37.6003 | 31.9507 | 31.913 | 31.574 | 31.1974 |
| Mass of Particle (g) | 0 | 5.6497 | 5.6497 | 5.6497 | 5.6497 |
| Mass of phenolic antioxidant (g) | 0.0264 | 0.0264 | 0.0264 | 0.0264 | 0.0264 |
| Mass of phosphite antioxidant (g) | 0.0377 | 0.0377 | 0.0377 | 0.0377 | 0.0377 |

A commercially available polyethylene grade HS5608 (by Braskem S. A.) was used as the polymer matrix for the preparation of Formulations F1-F4. This polymer is a high density polyethylene having a melt index 12 (190° C./21.6 kg) of 7.5 g/10 min and a density of 0.954 g/cm$^3$. The Reference polymer composition sample was prepared using the HS5608 without any particle addition.

The compositions were prepared through melt blending the components in a HAAKE Rheomix Lab Mixer PolyLab System (torque rheometer) at 160° C., 50 RMP for 3 min.

2 mm plates for mechanical properties assessment were prepared according to ASTM D4703 (Practice for Compression Molding Thermoplastic Materials into Test Specimens, Plaques, or Sheets) using the following conditions:

Pre-contact Temperature (° C.)=190
Pre-contact Time (min.)=5
Pre-contact Pressure (MPa)=0.6
Molding Temperature (° C.)=190
Molding Time (min.)=5
Molding Pressure (MPa)=5
Cooling Rate=15° C./min Environmental Stress Cracking Resistance tests were performed following ASTM D1693 (Bell Test), condition B, 2 mm plate, Igepal 50% in water, 50° C., F50% failure time (h).

The dispersion quality assessments were performed using microscopy image (5000×) performed in a SEM Phenon Inspect Electron Microscopy.

The inventive additive samples dispersed in the polymer composition exhibited the following performance as shown in Table 3 in the polymer composition.

TABLE 3

ESCR and dispersion quality of the polymer composition samples

|  | REFERENCE | F1 | F2 | F3 | F4 |
|---|---|---|---|---|---|
| ESCR (F50%; h) | 174 | >1000 | >1000 | >1000 | >1000 |
| Dispersion Quality* | — | very bad | bad | good | very good |

*Based in the number of PVA particle agglomerates observed in microscopy at 5000 X as shown in FIG. 4 A-D Example 2—Hybrid (Silica/PVA) Particles Sample Preparation Hybrid Particle Production Suspension In a 600 mL Becker flask, 5.88 of silica (Gasil AB 103/01) and 28 mL of POLYMER PRECURSOR SOLUTION as prepared in Example 1 (2.5 wt % of PVA in water) were added into 500 mL of distillated water. The suspension was vigorously stirred for 1 h to break the agglomerates.

Hybrid Particle Production

Hybrid PVA/silica particles were produced by spray drying method. The following conditions were set up in a Mini Spray Dryer Büchi B-290:
1. Feeding method: continuous production by using 500 mL batch of the HYBRID PARTICLE PRODUCTION SUSPENSION was continuously stirred using a magnetic stirrer while feeding in the spray dryer, under the following conditions:
2. Inlet temperature=160° C.
3. Outlet temperature=was kept >60° C. during particle production
4. Aspirator=80%
5. Pump=26%

Hybrid Particle Compatibilization

Hybrid particles were further modified with a compatibilizing agent (stearic acid reagent grade, 95%). The final stearic acid concentration was calculated based on particle mass. To produce the compatibilized hybrid particles, the following procedure was conducted in a way that a final stearic acid concentration of 10 wt % in the particle was obtained.
1. 1 g of stearic acid was transferred to a 250 mL Becker Flask containing 100 mL of acetone and placed under magnetic stirring until complete stearic acid dissolution.
2. To perform compatibilization, a mass of 10 g of unmodified hybrid particles was transferred to a Becker Flask having corrected stearic acid to obtain the compatibilized hybrid particles.
3. The Becker Flask containing the particles were placed on a stirrer hot plate, where the evaporation was conducted under stirring at 60° C. and under nitrogen flow.
4. After the particle exhibited a "paste appearance", the complete drying was conducted inside a vacuum oven at 60° C. overnight.
5. The compatibilized hybrid particle was then stored inside a desiccator for further formulation.

Results

Hybrid Particle Polymer Composition Formulation

As a reference and for the polymer matrix, the same commercial Braskem grade HS5608 was used.

The polymer compositions were prepared by melt blending in a HAAKE Rheomix Lab Mixer PolyLab System (torque rheometer) at 160° C., 50 RMP for 3 min. Formulations are presented in Table 4.

TABLE 4

Polymer composition formulations with hybrid anti-ESC additive particles

|  | #1 | #2 | #3 | #4 | #5 | #6 |
|---|---|---|---|---|---|---|
| Particle Concentration in the Formulation (wt %)= | 0 | 1 | 3 | 5 | 7 | 10 |
| PVA in the Particle (V/V %)= | — | 20 | 20 | 20 | 20 | 20 |
| Silica in the Particle (V/V %)= | — | 80 | 80 | 80 | 80 | 80 |
| Stearic Acid in the particle (wt %)= | — | 10 | 10 | 10 | 10 | 10 |
| PVA concentration in the Formulation (wt %)= | — | 0.1 | 0.3 | 0.5 | 0.7 | 1.0 |
| Mass of Polymer Matrix (g)= | 37.6003 | 37.2237 | 36.4704 | 35.7171 | 34.9638 | 33.8339 |
| Mass of AOX phenolic (g)= | 0.0264 | 0.0264 | 0.0264 | 0.0264 | 0.0264 | 0.0264 |
| Mass of AOX phosphite (g)= | 0.0377 | 0.0377 | 0.0377 | 0.0377 | 0.0377 | 0.0377 |
| Mass of Particle (g)= | 0 | 0.3766 | 1.1299 | 1.8832 | 2.6365 | 3.7664 |

2 mm plates for assessment of mechanical properties were prepared according to ASTM D4703 (Practice for Compression Molding Thermoplastic Materials into Test Specimens, Plaques, or Sheets) in the following conditions:

Pre-contact Temperature (° C.)=190

Pre-contact Time (min.)=5

Pre-contact Pressure (MPa)=0.6

Molding Temperature (° C.)=190

Molding Time (min.)=5

Molding Pressure (MPa)=5

Cooling Rate=15° C./min

Environmental Stress Cracking Resistance tests were performed according to ASTM D1693 (Bell Test), condition B, 2 mm plate, Igepal 50% in water, 50° C., F50% failure time (h).

Hybrid Particle Performance

The anti-ESC standard efficiency rate was assessed for the obtained hybrid particle. As detailed above, the anti-ESC standard efficiency rate is defined by the slope obtained by the linear fitting using a least squares regression analysis of ln(ESCR) (measured by Bell test) against Particle Amount (wt %) in the interval of 0 to 10 wt % of particle concentration in the polymer composition. The ESCR results are shown in Table 5.

Figure 5:
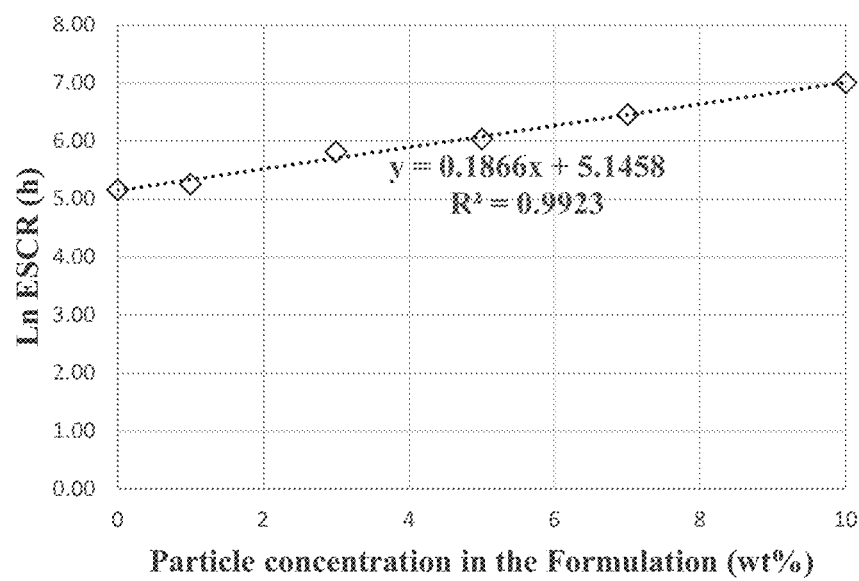
FIG. 5 shows the correlation of the ESCR versus inventive particle concentration according to embodiments of the present disclosure

FIG. 5 shows the plotted resulting ESCR data in relation to the particle concentration.

TABLE 5

LN ESCR results for particle performance evaluation

| Particle Amount (wt %) | ESCR (h) | Ln(ESCR) |
|---|---|---|
| 0 | 174 | 5.16 |
| 1 | 192 | 5.26 |
| 3 | 334 | 5.81 |
| 5 | 417 | 6.03 |
| 7 | 640 | 6.46 |
| 10 | 1100 | 7.00 |

As shown in FIG. 5, for the hybrid particle prepared as described comprising PVA as the anti-ESC active phase and Gasil Silica as support, a standard efficiency rate of 0.19 In (ESCR)/wt % was obtained.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. An anti-environmental stress cracking (ESC) additive powder, comprising:
   an environmental stress cracking (ESC) active phase, the ESC-active phase being a polymer phase comprising one or more polar polymers or non-polar polymers, and
   a solid support phase comprising an organic or inorganic particle.

2. The anti-ESC additive of claim 1, further comprising:
   a compatibilizing phase on a surface of the ESC-active phase, having a compatibilizing agent selected from organic acids, anhydrides of organic acids, amides of organic acids, salts of organic acids, epoxies, silanes, ionomers, and any combinations thereof.

3. The anti-ESC additive of claim 1, wherein the ESC-active phase comprises a polar polymer.

4. The anti-ESC additive of claim 3, wherein the polar polymer is a polymer containing hydroxyl, carboxylic acid, carboxylate, ester, ether, acetate, amide, amine, epoxy, imide, imine, sulfone, or phosphone groups, or their derivatives.

5. The anti-ESC additive of claim 3, wherein the polar polymer is a water-insoluble polar polymer, wherein the water-insoluble polar polymer is selected from polymers containing carboxylic acid, carboxylate, ester, ether, acetate, amide, amine, epoxy, imide, imine, sulfone, phosphone, and any derivatives of the aforementioned groups.

6. The anti-ESC additive of claim 3, wherein the polar polymer is a water-soluble polar polymer, wherein the water-soluble polar polymer is selected from polymers containing poly(vinyl alcohol) (PVA), chitosan, gelatin, dextran, poly(lactic acid), poly(ethylene glycol), cellulose microfibrils, cyclodextrin, poly(ε-caprolactone), carboxymethyl cellulose, n-vinylcaprolactam, poly(ethylene glycol) methyl ether, cellulose nanofiber, poly(ethylene glycol) methacrylate, poly((propylene glycol) methacrylate), and poly(vinyl methyl ether).

7. The anti-ESC additive of claim 3, wherein the polar polymer is a polymer hydrogel.

8. The anti-ESC additive of claim 3, wherein the polar polymer is crosslinked.

9. The anti-ESC additive of claim 1, wherein the solid support is present in an amount ranging from 0.1 to 99.9 wt % of the anti-ESC additive powder.

10. The anti-ESC additive of claim 1, wherein the anti-ESC additive powder has an average particle size of less than 200 μm.

11. The anti-ESC additive of claim 1, wherein the ESC-active phase is present in an amount ranging from 0.1 to 99.9 wt % of the anti-ESC additive.

12. A polymer composition, comprising:
    a matrix polymer; and
    an anti-ESC additive powder of claim 1.

13. The polymer composition of claim 12, wherein the anti-ESC additive powder further comprises a compatibilizing phase on a surface of the ESC-active phase.

14. The polymer composition of claim 12, further comprising: a compatibilizing agent dispersed in the polymer composition.

15. The polymer composition of claim 12, wherein the anti-ESC additive powder is a rigid particle having a stiffness that is at least that of the matrix polymer.

16. The polymer composition of claim 12, wherein the polymer composition has a stiffness loss rate less than 100 MPa/% (w/w) measured by the slope of the linear fitting curve of the flexural modulus resistance against anti-ESC additive amount (% w/w) using a concentration range from 0 to 10 (% w/w), wherein the flexural modulus is measured according to ASTM D790, procedure B, at room temperature, using the secant modulus at 1% strain calculus.

17. The polymer composition of claim 12, wherein the polymer composition exhibits:
    i) an anti-ESC standard efficiency rate of a minimum of 0.01 obtained by a Bell test, performed according to ASTM D1693-15, or
    ii) an anti-ESC additive pure efficiency rate of a minimum of 0.01 obtained by Ohde-Okamoto test, or
    iii) an anti-ESC additive intrinsic efficiency rate improvement of greater than 10% measured by a notched specimen in a creep test configuration, a temperature of 50° C., and using two different media, a neutral medium and an active medium.

18. The polymer composition of claim 12, wherein the anti-ESC additive is present in an amount up to 10 wt % of the polymer composition.

19. The polymer composition of claim 12, wherein the matrix polymer is a polyolefin.

20. An article, comprising the polymer composition of claim 12.

* * * * *